Dec. 24, 1929.  P. MacGAHAN  1,740,548
ELECTRICAL MEASURING INSTRUMENT
Filed July 11, 1928

INVENTOR
Paul MacGahan.
BY
ATTORNEY

Patented Dec. 24, 1929

1,740,548

UNITED STATES PATENT OFFICE

PAUL MacGAHAN, OF ORANGE, NEW JERSEY, ASSIGNOR TO WESTINGHOUSE ELECTRIC & MANUFACTURING COMPANY, A CORPORATION OF PENNSYLVANIA

ELECTRICAL MEASURING INSTRUMENT

Application filed July 11, 1928. Serial No. 291,874.

My invention relates to electrical measuring instruments and more particularly to meters of the d'Arsonval type.

My invention has for an object to provide means for reducing the cost, improving the accuracy, and substantially eliminating the flux leakage of an instrument of the above-indicated type.

It is characteristic of my invention that means is provided for constructing the pole pieces for the permanent magnet of a measuring instrument in such manner that the pole pieces are identical and symmetrical and constitute a unitary structure.

It is further characteristic of my invention that the coacting surfaces of the pole projections and the pole pieces are substantially circular in lateral section to permit of simplified manufacturing operations.

My present device may be made almost completely on an automatic screw machine from cylindrical rod or tubing, thereby greatly reducing the cost of manufacture, as compared with prior structures, and permitting greater accuracy in the construction of the component parts of the device.

Figure 1:
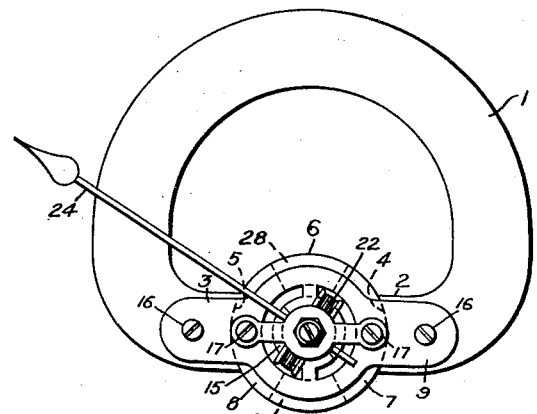

My invention, however, may be more readily understood by reference to the accompanying drawings, wherein, Figure 1 is a plan view of an electrical measuring instrument constructed in accordance with my invention, the scale and cover thereof being removed.

Figure 2:
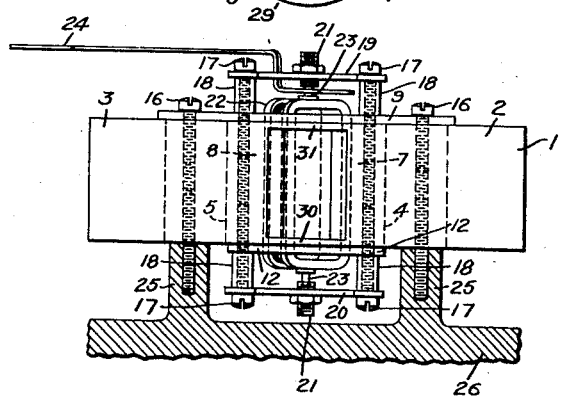
Figure 3:
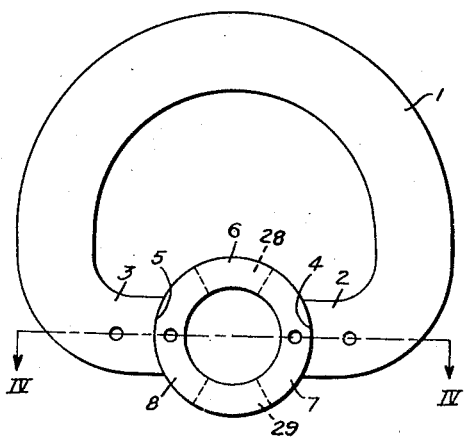
Figure 4:
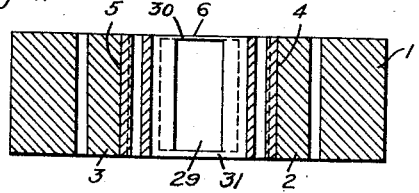
Figure 5:
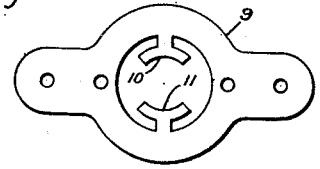
Figure 6:
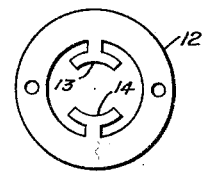

Fig. 2 is a view, in side elevation, partially in section, of the instrument shown in Fig. 1, Fig. 3 is a detail view of the magnet and pole pieces shown in Figs. 1 and 2, Fig. 4 is a view, in cross-section, taken on line IV—IV of Fig. 3, Fig. 5 is a plan view of the upper retaining plate shown in Figs. 1 and 2, and Fig. 6 is a plan view of the lower retaining plate shown in Fig. 2.

Referring to the drawings, a measuring instrument of the d'Arsonval type includes a substantially annular permanent magnet 1. The magnet may be cut on a lathe from a piece of tubular stock. One side of the annular piece thus obtained may be flattened, and a hole of greater diameter than the thickness of the magnet may be bored therein in a direction parallel to the axis of the piece. The resulting structure, as shown in Figs. 1 and 3, is a substantially annular magnet having aligned hole portions 2 and 3, and the opposed faces of the pole pieces constitute curved surfaces 4 and 5 for a purpose hereinafter described.

A cylindrical member 6, substantially coextensive in length with the width of the magnet 1 and having an external diameter substantially equal to the distance between the pole surfaces 4 and 5, may be provided. The member 6 may also be cut and shaped, on a lathe or screw machine, from tubular stock. Diametrically opposed openings may then be cut in through the side wall of the member 6, as indicated in dotted lines in Fig. 3. The openings 28 and 29 extend longitudinally of the cylindrical member 6 but are shorter than the longitudinal dimension of the cylinder. The resulting structure is, therefore, a cylinder having diametrically opposed solid portions 7 and 8 connected, at the ends of the cylindrical member, by webs 30 and 31 of relatively small area in cross section.

The member 6 may then be placed in the opening defined by the pole portions 2 and 3. The proportions of the elements are such that a sliding fit between the member 6 and the curved faces of the pole portions results.

When the member 6 is in operative position, the solid portions 7 and 8 thereof cooperate with the pole surfaces 4 and 5, respectively, to constitute pole pieces. The webs 30 and 31 connecting the solid portions 7 and 8 are so small in cross-sectional area that, although they afford sufficient mechanical connection between the portions, readily become magnetically saturated, and the reluctance thereof is of such a value that very little of the useful flux is diverted from the air gap.

Tests of samples, made according to this design, indicate that the magnetic flux by-passed through the webs is approximately five percent of the total flux, and this small proportion is more than compensated by the increased efficiency resulting from the substantially annular form of the magnet 1.

The member 6 is held in position by means of an upper plate 9 having inwardly projecting portions 10 and 11 and a lower plate 12 having inwardly projecting portions 13 and 14. A core 15 of magnetizable material is held in position in the central part of the opening in the member 6 by the projecting portions 10 and 11 and 13 and 14 of the upper and lower plates 9 and 12, respectively.

The upper plate 9 is secured to the pole portions 2 and 3 of the magnet 1 by means of screws 16, which extend therethrough and cooperate with screw-threaded apertures in projections 25 on a supporting base 26, as shown in Fig. 2. The member 6 is secured to the plate 9 by screws 17 that coact with spacers 18 to hold a bridging member 19 in proper spaced relation with respect to the plate. A lower bridging member 20 is held in position in a similar manner by means of spacers 18 and screws 17. Adjustable jewel-bearing supports 21 are mounted in the bridging members 19 and 20 for rotatably supporting an armature 22 on pivots 23 extending therefrom.

A pointer 24 is mounted on the armature 22 to indicate the relative position thereof on a scale (not shown) disposed adjacent to said pointer.

The inner faces 4 and 5 of the magnet 1, the outer surface of the member 6, the inner surfaces of the member 6, and the coacting surface of the core 15 are all concentric cylindrical surfaces. These surfaces may readily be formed by means of automatic screw machines, whereby cheapness and accuracy of manufacture may be ensured.

It is to be noted that the magnet is so shaped that the flux therein follows the natural grain of the iron throughout its path through the magnet, which is not the case in the usual magnets of horse-shoe shape. A reduction in flux leakage is thereby effected, and the efficiency of the meter is greatly improved.

All of the structure, excepting the magnet 1, the member 6 and the core 15 is preferably of non-magnetic material, so that the flux is not influenced to take improper paths.

I wish also to point out that it is desirable, though not entirely essential, to make the member 6 of a steel alloy which will saturate at low densities, such as one of the nickel-iron alloys, so as to further reduce the amount of flux by-passed or shunted from the gap by the connecting webs remaining when the sides of the pole pieces are cut away, as previously explained.

While my invention is shown and described for use in connection with d'Arsonval indicating meters, I do not wish it to be thus limited, inasmuch as the structure is equally applicable to meters of other kinds embodying pole pieces, as well as to small motors of different kinds.

While I have shown my invention as embodied in a particular construction, I do not wish to be limited to such precise details but seek, in the appended claims, to cover all constructions that come within the scope of my invention.

I claim as my invention:—

1. In an electrical instrument, a magnet structure comprising a substantially annular magnet having opposed pole portions, said pole portions having curved surfaces, a hollow cylindrical member proportioned to be received between the curved surfaces of said pole portions, said cylindrical member embodying means constituting pole faces for cooperation with the ends of said pole portions.

2. The combination with a magnet having spaced poles, of a pole-piece structure associated therewith comprising a hollow substantially cylindrical member, diametrically opposed portions of the side wall of which are cut away, and means for securing said member in the space between said poles with the remaining solid portions of said member respectively adjacent to said poles.

3. The combination with a magnet having adjacent spaced poles, pole pieces for said poles, and means for maintaining said pole pieces in spaced relation comprising portions of small cross-section dimensions connecting the respective ends of the pole pieces.

4. The combination with a magnet having adjacent spaced poles, pole pieces for said poles, and means for maintaining said pole pieces in spaced relation comprising portions of small cross-section dimensions connecting the respective ends of the pole pieces and integral therewith.

5. A pole-piece structure comprising a hollow cylindrical member having diametrically opposed slots therein extending longitudinally of said member, the length of said slots being less than the longitudinal dimension of said cylindrical member.

6. In an electrical instrument, a magnet including adjacent pole portions having opposed curved surfaces, a cylindrical member embodying means constituting pole pieces for cooperation with said pole portions, the radii of curvature of said curved surfaces and of the outer surface of said cylindrical member being substantially equal.

7. In combination, a magnet having spaced opposed pole portions, pole pieces for said pole portions, said pole pieces comprising a unitary structure so proportioned that it may be received between said pole portions and have a relatively snug fit with respect thereto, and means for retaining said structure in position with respect to said pole portions.

In testimony whereof, I have hereunto subscribed my name this 3 day of July, 1928.

PAUL MacGAHAN.